United States Patent
Choi

(10) Patent No.: US 6,830,134 B2
(45) Date of Patent: Dec. 14, 2004

(54) SNOW CHAIN MECHANISM FOR A VEHICLE

(75) Inventor: Jung-Sik Choi, Chonrabuk-do (KR)

(73) Assignee: Hyundai Motor Company, Seoul (KR)

( * ) Notice: Subject to any disclaimer, the term of this patent is extended or adjusted under 35 U.S.C. 154(b) by 13 days.

(21) Appl. No.: 10/319,267

(22) Filed: Dec. 13, 2002

(65) Prior Publication Data

US 2003/0116952 A1 Jun. 26, 2003

(30) Foreign Application Priority Data

Dec. 26, 2001 (KR) .......................................... 2001-84993

(51) Int. Cl.⁷ .............................. B60T 1/00; B60S 9/00; B60C 11/00
(52) U.S. Cl. ........................ 188/4 B; 188/4 R; 280/757; 152/214
(58) Field of Search .............................. 152/213 R, 214; 188/4 R, 4 B, 5; 280/757, 575; 301/38.1, 41.1

(56) References Cited

U.S. PATENT DOCUMENTS

| | | | | |
|---|---|---|---|---|
| 1,150,148 A | * | 8/1915 | Putnam | 188/4 R |
| 2,277,036 A | * | 3/1942 | Chaussee | 188/4 B |
| 4,299,310 A | * | 11/1981 | Torneback | 188/4 R |
| 4,338,988 A | | 7/1982 | Brooks et al. | |
| 4,657,118 A | * | 4/1987 | Andersson | 188/4 R |
| 4,800,939 A | * | 1/1989 | Torneback | 152/214 |
| 5,080,443 A | * | 1/1992 | Torneback | 301/6.1 |
| 5,386,888 A | * | 2/1995 | Hofmann | 188/4 B |
| 5,785,351 A | * | 7/1998 | Chang et al. | 280/757 |
| 6,409,215 B1 | * | 6/2002 | Holmgren | 280/757 |
| 6,651,783 B1 | * | 11/2003 | Atkinson, Jr. | 188/4 B |
| 2001/0027596 A1 | | 10/2001 | Lyne, Jr. | |

* cited by examiner

Primary Examiner—Russell D. Stormer
Assistant Examiner—Jason R. Bellinger
(74) Attorney, Agent, or Firm—Morgan Lewis & Bockius LLP

(57) ABSTRACT

A snow chain mechanism for easily applying snow chains to the wheels of a vehicle and dismounting the snow chains therefrom. The mechanism includes a chain assembly mounted with a plurality of chains rotated by a chain assembly driving unit mounted to an axle of a vehicle via a bracket. Also included is a control unit for controlling the chain assembly driving unit, thereby allowing the chains to be positioned between the wheels and road bed when the driver commands the snow chain mechanism to operate once the vehicle has been started.

5 Claims, 5 Drawing Sheets

SNOW CHAIN MECHANISM FOR A VEHICLE

FIELD OF THE INVENTION

The present invention relates to a snow chain mechanism for a vehicle, and more particularly, to a snow chain mechanism for preventing slippage of vehicle wheels on slippery terrain.

BACKGROUND OF THE INVENTION

The wheels of a vehicle are designed to promote stability and comfort while the vehicle runs over ordinary surfaces. However, during snowy conditions, snow chains are often installed on the wheels for traction and also to prevent slippage of the wheels. Typically, snow chains are mounted around the outer perimeter tread or a tire. Friction between the chains and road surface prevents the slippage of the wheels while the wheels are rotating.

A drawback of the conventional snow chain(s) is that it takes a long time to install the chains. Also, due to the inconvenience of mounting snow chains on tires there is a danger that users will not install the chains. Another drawback is that snow chained wheels increase the height of a cargo truck thereby decreasing the efficiency of loading and unloading cargoes.

SUMMARY OF THE INVENTION

The present invention provides a snow chain mechanism for a vehicle adapted so the driver can easily mount and dismount snow chains to and from the wheels, thereby making it more probable that snow chains will be used and, thus, increasing safety on the roads.

In accordance with an embodiment of the present invention, the snow chain mechanism for a vehicle comprises a chain assembly mounted with a plurality of chains, chain assembly driving means mounted to an axle of a vehicle via a bracket for rotating the chain assembly, and control means for controlling the chain assembly driving means for prompting the chain assembly driving means to rotate the chain assembly, thereby allowing the chains to be positioned between the wheels and road bed when the driver commands the snow chain mechanism to operate once the vehicle has been started.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
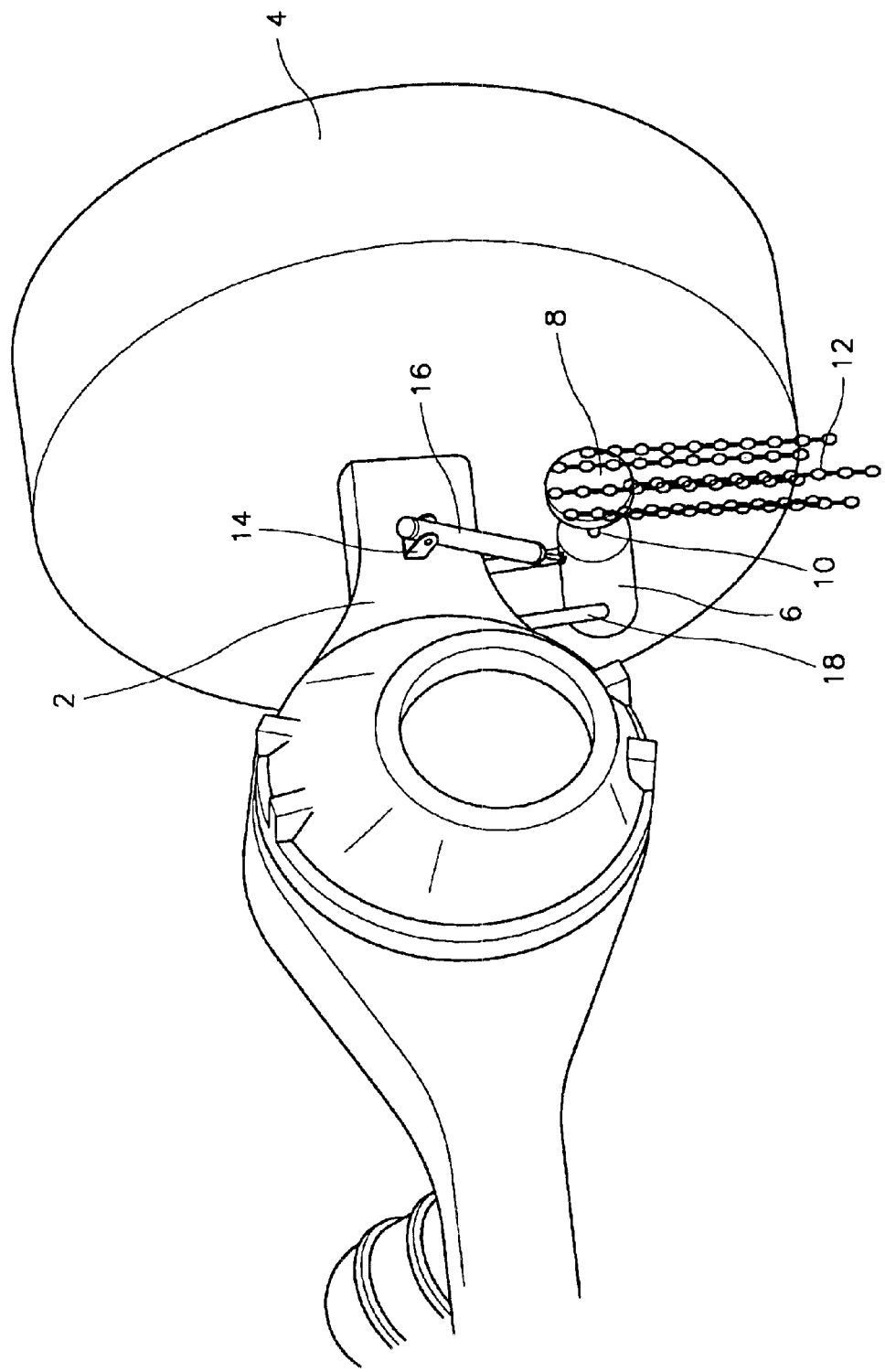
FIG. 1 is a schematic diagram of an embodiment of the invention illustrating a snow chain mechanism mounted according to an embodiment of the present invention.

FIG. 1 snows a chain mechanism mounted on an axle of a vehicle. The chain mechanism includes a motor 6 for rotating a rotating plate 8 mounted with a plurality of chains 12 via a rotating axle 10. In a preferred embodiment, the motor 6 is pivotably supported by a second bracket 18 mounted underneath the axle 2.

One side of the motor 6 is coupled to a cylinder 16. The cylinder 16 is coupled at the other side to a first bracket 14, which is mounted to a lateral surface of the axle 2. Furthermore, the motor 6 can be pivoted in relation to the operation of the cylinder 16.

Figure 2:
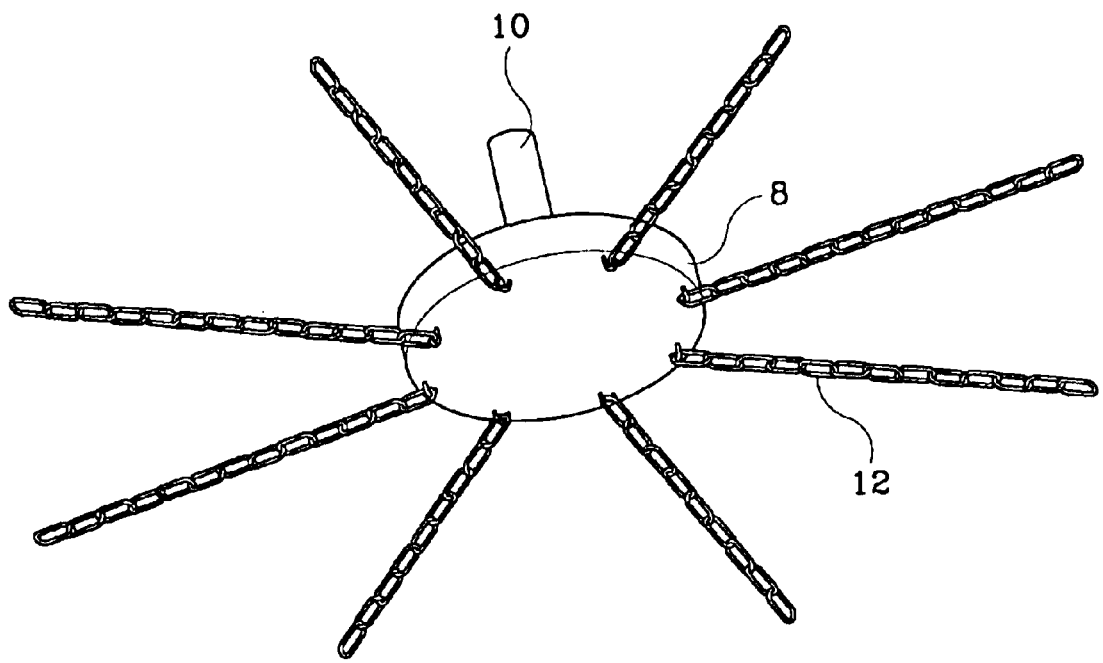
FIG. 2 is a perspective view of the chain assembly illustrated in FIG. 1.

FIG. 2 shows the rotating plate 8 coupled at a circumferential margin with a plurality of chains 12 arranged in a radial manner. In use, when the rotating plate 8 is rotated by rotary drive of the motor 6, the plurality of chains 12 are unfolded to prompt the chains 12 to be spread under the wheels 4. Thus, preventing the tires from slipping on snowy or icy roads.

Figure 3A:
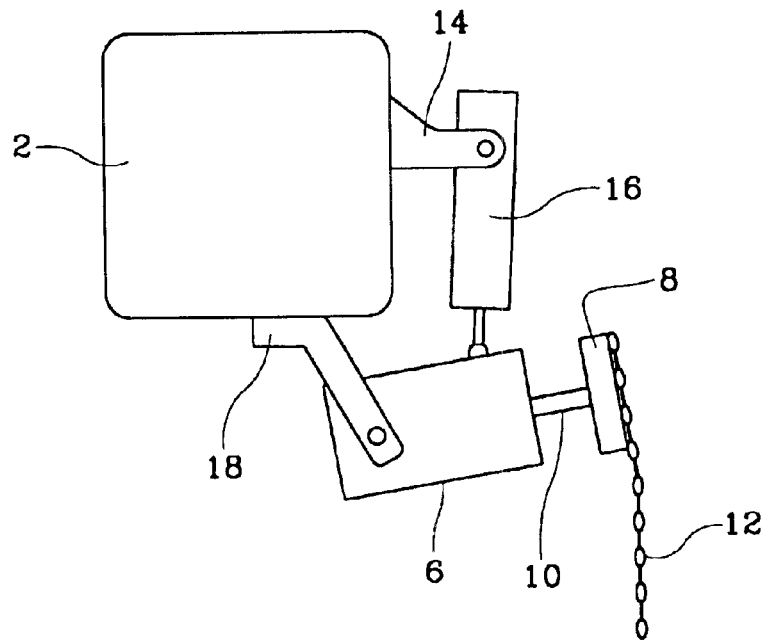
FIGS. 3a and 3b are schematic diagrams illustrating an operational state of a snow chain mechanism according to an embodiment of the present invention.

FIG. 3a shows that the cylinder 16 does not operate when a vehicle is running on a normal roadbed or when the vehicle is stopped. When not in use, the rotary plate 8, coupled to the rotating axle 10 of the motor 6, maintains a position above the wheels, thereby causing the chains 12 to fold as the motor 6 is pivoted upwards.

Figure 3B:
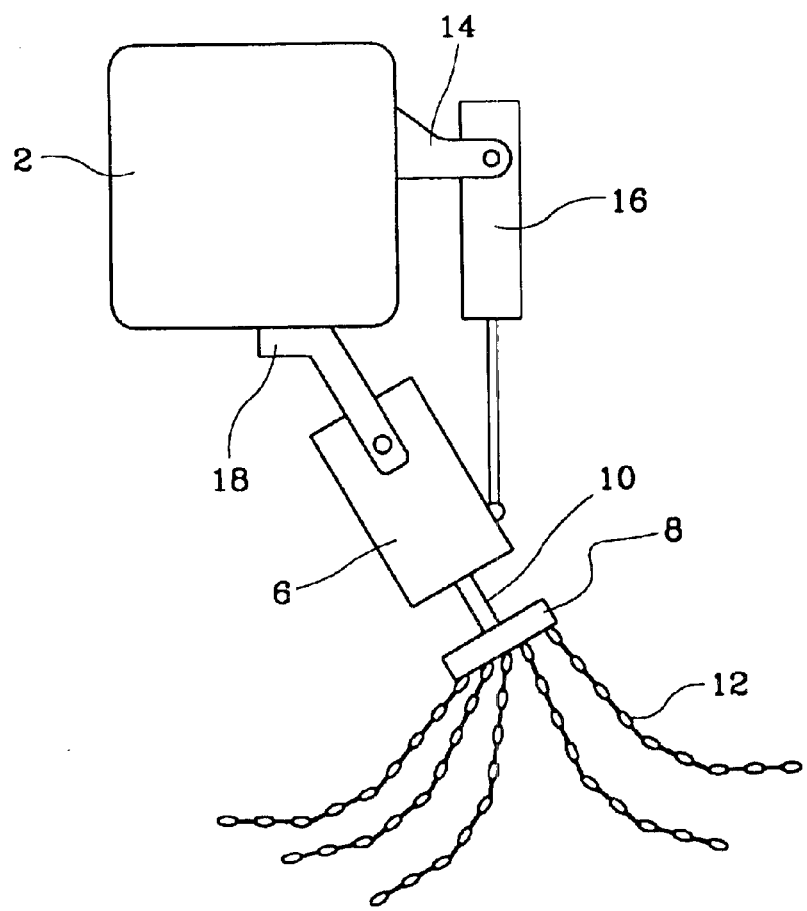

In FIG. 3b, when a vehicle is running on snowy terrain, the cylinder 16 is activated and the motor 6 is pivoted downwards, thereby unfolding the chains 12 in a radial fashion.

Figure 4:
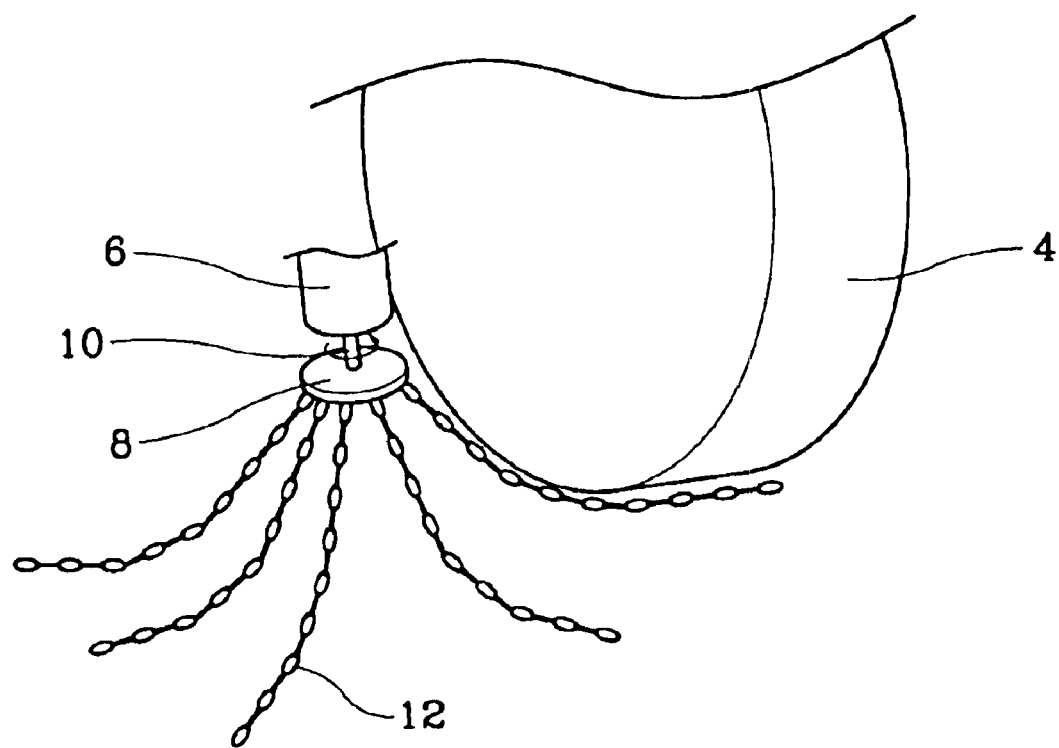
FIG. 4 is a schematic drawing exemplifying a snow chain mechanism performing a slippage prevention operation of the wheels according to an embodiment of the present invention.

In use, when the motor 6 is moved downwards and rotated the chains 12 of the rotary plate 8 are radially spread. Continued rotation of the rotary plate, by the motor 6, maintains a state where the chains 12 are laid underneath the wheel of the vehicle (FIG. 4). The rotating speed of the motor 6 is determined based on the velocity of the vehicle such that the chains 12 are between the vehicle tire and the roadway for the appropriate time frame.

Figure 5:
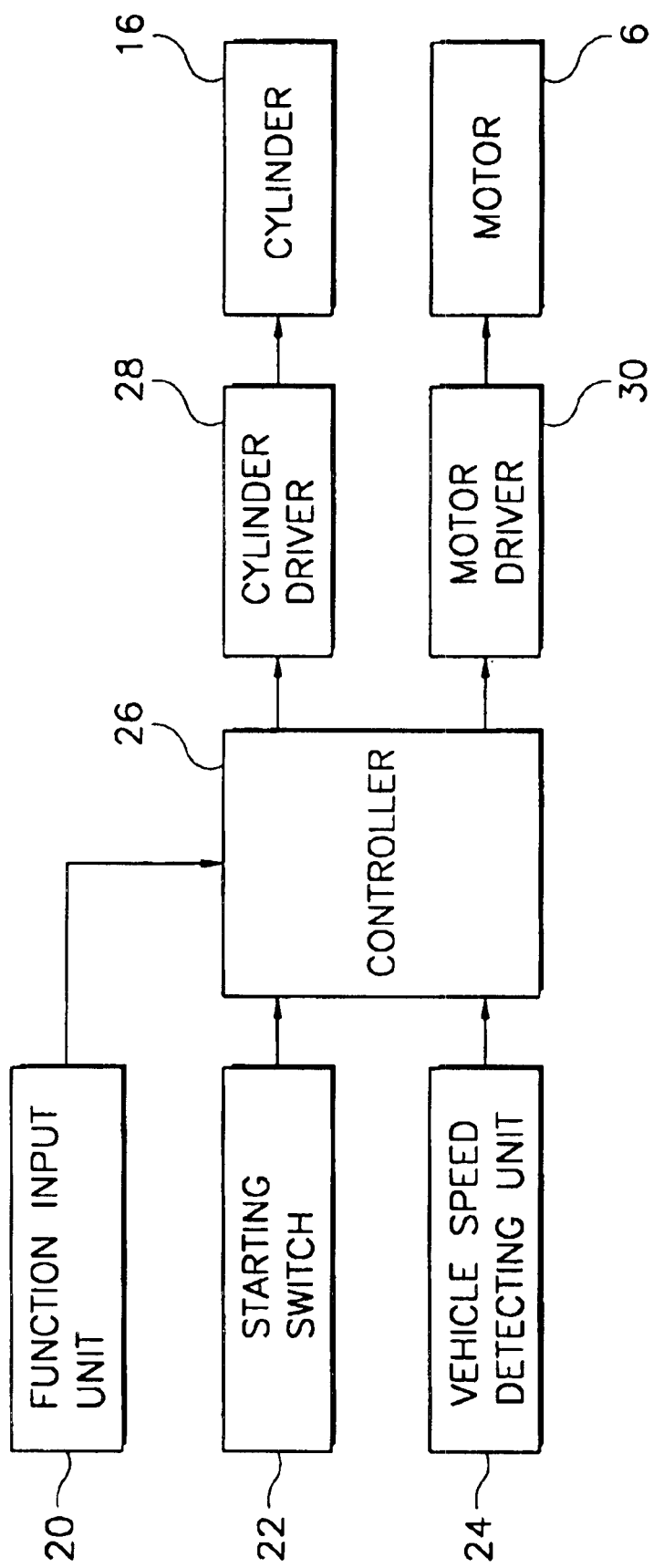
FIG. 5 is a block diagram illustrating the driving control apparatus of a snow chain mechanism according to an embodiment of the present invention.

FIG. 5 shows the snow chain mechanism driving control device of a vehicle according to the present invention. The snow chain mechanism driving control device includes a function input unit 20, a starting switch 22, a vehicle speed detecting unit 24, a controller 26, a cylinder driver 28 and a motor driver 30. The function input unit 20, disposed at an instrument panel close to the driver's seat, serves to generate a function input signal for activating or releasing the snow chain mechanism in response to input from a driver. In use, the starting switch 22 is switched in response to a driver manipulating a starting key. This generates a start switching signal. The vehicle speed detecting unit 24 then detects the speed of the vehicle and generates a vehicle speed detecting signal.

In use, when a start switching signal is inputted from the starting switch 22 a function input signal for activating the snow chain mechanism is received from the function input unit 20. Next, the controller 26 activates the downward movement of the cylinder 16. This moves the rotary plate 8 mounted with a plurality of chains 12 downward. The controller 26 also performs the control of rotatably driving the motor 6 against the vehicle speed detected by the vehicle speed detecting unit 24. Rotary speed of the motor 6 is controlled by the controller 26 in response to change in the speed of the vehicle which is detected by the vehicle speed detecting unit 24. The motor driver 30 performs the driving operation of rotating the motor 6 in response to the control of the controller 26. And the cylinder driver 28 activates the downward and upward movement of the cylinder 16.

When a vehicle is stopped, the motor 6 is arranged to face upwards as shown in FIG. 3a. Thereby, moving the rotary plate 8 upwards such that the chains 12 mounted to the rotary plate 8 maintain a lifted state.

If should be noted that the present invention is not intended to be limited to the aforesaid embodiments. Various modifications may be made within the scope of the embodiments disclosed. It is intended that the invention be defined by the claims and their equivalents.

What is claimed is:

1. A snow chain mechanism for a vehicle, comprising:
   a chain assembly mounted with a plurality of chains;
   a chain assembly driving means mounted to an axle of a vehicle by a bracket for rotating said chain assembly; and
   a control means for controlling said chain assembly driving means for prompting said chain assembly driving means to rotate said chain assembly, thereby positioning the chains between the wheel and a road bed when a driver commands the chain mechanism to operate after the vehicle has been started;
   wherein said chain assembly driving means comprises a motor coupled to said rotary plate by a rotary axle for rotating said rotary plate;
      a motor driver for rotatably driving said motor in response to control of said control means;
      a cylinder coupled to one side of the motor body for vertically moving said motor; and
      a cylinder driver for operating said cylinder in response to the control of said control means.

2. The mechanism as defined in claim 1, wherein said chain assembly comprises:
   a round rotary plate; and
   a plurality of chains radially arranged along the margin of said rotary plate.

3. The mechanism as defined in claim 1, wherein said control means controls the rotating speed of said motor in relation to the vehicle speed of the vehicle.

4. A snow chain mechanism for a vehicle, comprising:
   a rotating member adapted to be disposed on a vehicle adjacent a wheel with an axis of rotation generally perpendicular to an axle carrying the wheel;
   a plurality of chains secured to said rotating member for radial extension in response to rotation of said member, wherein said rotating member and chains are configured and dimensioned together to sequentially position said chains between a road surface and the wheel when driving in response to rotation of said member;
   a controller programmed to synchronize rotation of said chains with rotation of the wheel; and
   a motor configured to rotate said chains in accord with a signal from said controller.

5. The snow chain mechanism of claim 4, further comprising:
   a hydraulic cylinder for actuating a shaft wherein said hydraulic cylinder moves the shaft from a first position to a second position;
   a motor coupled to said shaft wherein said motor is moveably mounted such that said motor can be positioned from a first upward position to a second downward position by said shaft moving from said first position to said second position; and
   a plurality of chains coupled with said motor such that said plurality of chains are rotated by said motor and wherein said rotation of said chains linearly extends said plurality of chains for displacement of said chains between a road surface and the wheel.

* * * * *